United States Patent

[11] 3,598,451

| [72] | Inventor | Roger E. Doerfler<br>Baltimore, Md. |
|---|---|---|
| [21] | Appl. No. | 822,170 |
| [22] | Filed | May 6, 1969 |
| [45] | Patented | Aug. 10, 1971 |
| [73] | Assignee | Hydrasearch Co., Inc.<br>Annapolis, Md. |

[54] DUAL RATIO PROPORTIONING VALVE
7 Claims, 6 Drawing Figs.

[52] U.S. Cl...................................................... 303/6 C,
60/54.5 E, 137/493.3, 137/493.6, 137/493.9,
188/152.11
[51] Int. Cl................................................ B60t 8/26,
B60t 11/34
[50] Field of Search............................................ 137/493.3,
493.6, 493.9; 60/54.5, 54.5 E; 303/6, 6 C; 188/152

[56] References Cited
UNITED STATES PATENTS

| 3,245,729 | 4/1966 | Shellhause.................... | 60/54.5 X |
| 3,489,465 | 1/1970 | Bueler........................... | 303/6 |
| 3,503,657 | 3/1970 | MacDuff....................... | 188/152 |
| 3,501,203 | 3/1970 | Falk.............................. | 303/6 |
| 3,508,792 | 4/1970 | Bueler........................... | 303/6 |

*Primary Examiner*—Milton Buchler
*Assistant Examiner*—John J. McLaughlin
*Attorney*—William J. Dick ABSTRACT: This patent discloses a duel ratio proportioning valve for proportioning fluid hydraulic pressure to one set of brakes of an automotive type vehicle having a hybrid brake system. As disclosed, the valve includes a valve body having a hydraulic fluid inlet and a hydraulic fluid outlet which is communicated by a bore. Mounted in the bore is a spool which is operable to seal the outlet from the inlet upon a first predetermined inlet pressure being reached. The valve includes means to proportion, after the first inlet pressure is reached, the rate of pressure increase at the outlet relative to the pressure increase at the inlet until a second hydraulic inlet pressure is reached. The valve also includes means for proportioning thereafter further pressure increases at the outlet relative to the inlet at a different rate than the first-mentioned proportioning means.

INVENTOR
ROGER E. DOERFLER

BY *William J. Dick*
ATTORNEY

DUAL RATIO PROPORTIONING VALVE

BRIEF DESCRIPTION OF THE INVENTION AND PRIOR ART

The present invention relates to valves and more particularly to hydraulically operated proportioning valves particularly adapted for use in hydraulic brake systems.

In automotive braking systems of recent years, it has been found desirable to combine the disc type brake with the conventional shoe-type brake. As is well known, disc brakes permit of increased applied braking pressure without locking and thus permit of a more precise control of the rolling friction of the tires against the surface upon which they are riding. In addition, even under adverse weight conditions, brake fade with disc-type brakes is almost nonexistent. Hybrid systems in which disc and shoe-type brakes are combined, create serious problems as to differential braking pressure between that which is required by the shoe brakes, just prior to locking, and that required by the disc brakes. A solution is to provide differential pressures between front disc-type brakes and rear shoe type brakes, which differential pressure is not solved by merely providing a differential braking area. Thus it becomes necessary to provide means which permits of an unimpeded increase in hydraulic pressure to the disc type brakes, upon increases in master cylinder pressure, while proportioning the hydraulic pressure applied to the shoe-type brakes upon a certain master cylinder pressure being reached.

More recently automotive safety standards have required that all new automotive vehicles be provided with dual master cylinders so that each set or pair of wheels has its own master cylinder. With dual master brake cylinders if one of the brake systems should fail, the other one should permit effective stopping of the motor vehicle. However, with a hybrid-type brake system wherein the front wheels of the vehicle are equipped with disc type brakes and the rear wheels of the vehicle are equipped with shoe type brakes, and where a proportioning valve is in use, if the front disc-type brakes fail and the driver of the motor vehicle must make an emergency stop, the rate of pressure increase to the rear or shoe-type brakes will be proportional and not in a direct 1:1 ratio with the inlet pressure created by the master cylinder which is still operative. Accordingly, it may be desirable to provide, on a proportioning valve, a split point which is in excess of the first split point wherein hydraulic pressure commences proportioning, to permit the rear brake shoes to receive close to full master cylinder pressure upon a certain predetermined overpressure being reached.

To this end, and in view of the above, it is a principal object of the present invention to provide a proportioning valve which permits first and second differential hydraulic pressures to be obtained between front and rear brake systems at two predetermined hydraulic inlet or master cylinder pressures.

Another object of the present invention is to provide a novel proportioning valve in which after the hydraulic inlet pressure reaches a predetermined pressure, the rate of pressure increase at the outlet decreases while the rate of pressure increase at the inlet remains constant.

Still another object of the present invention is to provide a novel valve having a first proportioning ratio after hydraulic inlet or master cylinder pressure reaches a predetermined amount, and a second proportioning ration after the inlet or master cylinder pressure reaches a second predetermined amount.

Yet another object of the present invention is to provide a novel valve, useful for dual master cylinder application in split brake systems, which valve will proportion at a predetermined rate but which will permit of override at a predetermined higher pressure in order to effect a margin of safety in the event of one brake system failure.

Still another object of the present invention is to provide a valve which functions to effect the above-identified results while being particularly useful for automotive-type vehicles having dual master cylinders and hybrid brake systems.

Other objects and a fuller understanding of the invention may be had by referring to the following description and claims taken in conjunction with the accompanying drawings in which:

Figure 1:
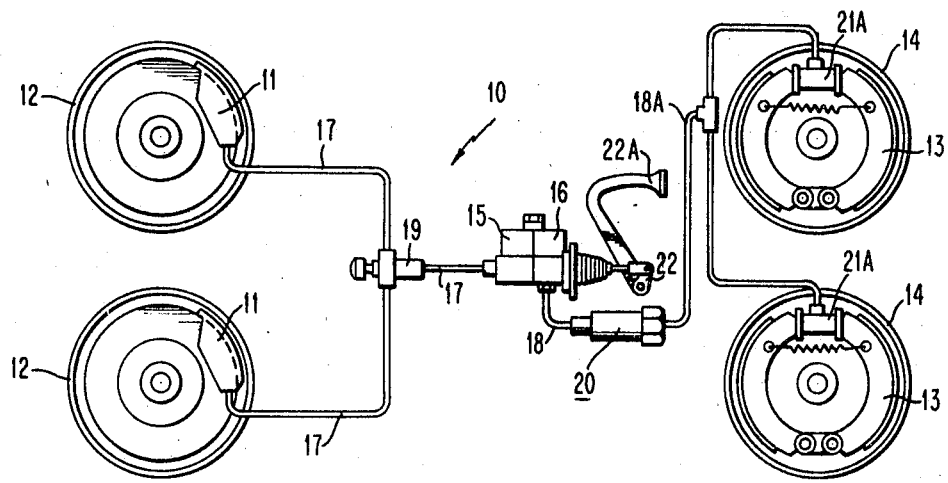
FIG. 1 is a schematic diagram of a hybrid, split brake system comprising conventional shoe-and-drum rear-mounted brakes, conventional front mounted disc brakes and including a valve constructed in accordance with the present invention.

Referring now to the drawings, and especially FIG. 1 thereof, a brake system 10 is schematically illustrated therein comprising, in the present instance, caliper-type disc brakes 11 mounted on front wheels 12 and shoe-type brakes 13 mounted on rear wheels 14. Connecting a first master cylinder 15 to the disc-type brakes 11 is piping 17, in the present instance intermediate the disc brakes 11 and master cylinder 15 there being a metering valve 19 such as that disclosed in the Doerfler copending application Ser. No. 707,096, filed on Feb. 21, 1968 and now U.S. Pat. No. 3,447,836 issued on June 3, 1969. Adjacent the first master cylinder 15 is a second master cylinder 16 which is connected to hydraulic piping 18 which connects a novel dual stage metering and proportioning valve 20 of the present invention which through hydraulic piping 18A connects the pistons 21A of the shoe-type brakes 13. As is conventional, both master cylinders 15 and 16 are actuated by linkage 22 and the usual foot pedal 22A.

Figure 2:
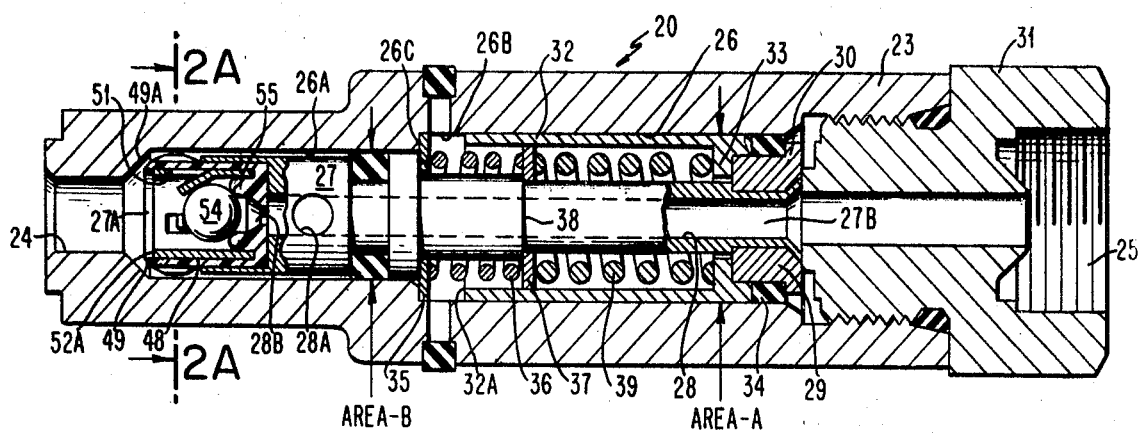
FIG. 2 is an enlarged view of a valve constructed in accordance with the present invention.

In accordance with the invention, the proportioning valve 20 proportions and programs the sequential operation of the hydraulic pressure to, in the illustrated instance, the shoe brakes 13 solely by hydraulic imbalance. To this end, and as shown in FIG. 2, the valve 20 comprises a valve body 23 having a hydraulic fluid inlet 24 and a hydraulic fluid outlet 25 communicated by a stepped bore 26. As shown in FIG. 1, the outlet 25 is connected to the rear shoe brakes 13 via the hydraulic piping 18A while the inlet 24 is connected to the master cylinder 16 through the hydraulic piping 18.

Figure 2A:
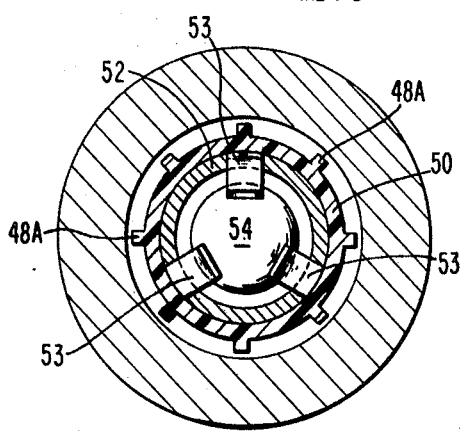
FIG. 2A is an enlarged sectional view taken along line 2A—2A in FIG. 2.

Referring now to FIG. 2, the bore 26 includes means operable to permit the hydraulic pressure at the inlet 24 to be reflected at the outlet until a first predetermined inlet pressure is reached. To this end, slidably mounted in the bore 26 is a spool 27, the spool having an inlet end 27A and an outlet end 27B and movable between a first (rest) position to the right and a second (sealing) position to the left. As shown in FIG. 2, the bore 26 includes a chamber 26A circumscribing and housing the inlet end 27A of the spool 27, and a counterbore portion 26B circumscribing the after or outlet end 27B of the spool. In order to provide fluid communication between the inlet 24 and outlet 25 when the spool 27 is in its first position, the spool is provided with a central axially extending conduit or passageway 28 having radial extensions 28A extending through the spool 27 so as to permit fluid communication between the inlet 24 and the outlet 25 therethrough. For purposes which will be more fully explained hereinafter, the conduit includes a second extension 28B which extends into a nose cone 48 at the inlet end 27A of the spool 27. As shown in FIG. 2A, the nose cone has circumferentially spaced, radially and axially extending flutes 48A mounted on a cylindrical insert 50.

At the outlet end 27B of the spool 27 is first piston means 29, in the present instance comprising a ring having a radially extending flange or end wall 30 which abuts a plug 31 screwed into the bore 26 of the valve 20. As shown, in the present instance the piston 29 is a separate piece to facilitate assembly of the valve, the piston being connected to the spool 27 so as to be slidably movable therewith. Circumscribing the spool 27 is a second piston 32, in the present instance cylindrical in form and having an inwardly and radially extending flangelike portion 33 adapted for butting engagement with the first piston 29. Intermediate the flange 30 of the first piston 29 and the flange 33 of the second piston 32 is an annular seal 34, in the present instance having a rectangular cross section and adapted to prevent fluid leakage past the first piston into the area or region of the second piston. The seal 34, in this manner, prevents hydraulic fluid leakage into the counterbore 26B. As shown, the cylinderlike second piston 32 has a forward terminal end 32A which is axially spaced from a disc or washer 35 which abuts a shoulder 26C intermediate the chamber 26A and the counterbore 26B. For reasons which will become more clear hereinafter, the second piston 32, unlike the first piston 29, is axially movable relative to the spool 27.

In order to hold the spool 27 in its first position prior to a first predetermined pressure being reached, biasing means, in the present instance a compression spring 36 is provided which tends, prior to the application of hydraulic pressure to the spool through the inlet 24, to keep the spool in its first or rest position, i.e. towards the right. As shown in FIG. 2, the spring 36 is positioned intermediate the disc or washer 35 and a second disc or washer 37. As shown also in FIG. 2, the second washer 37 abuts a shoulder 38 on the spool 27 which limits the washer's movement to the left or towards the disc or washer 35. Intermediate the second washer 37 and the flange 33 of the second piston 32 is a second biasing means, in the present instance a spring 39 of heavier construction than the spring 36. At this point it is noted that the spring 39 may be heavy enough, relative to the spring 36, that the spring 36 compresses with movement of the spool 27 to the left or towards its second position, before the spring 39.

In order to permit axial movement of the spool 27 between its first and second positions, solely by hydraulic imbalance, and to permit the movement of the spool 27 to overcome the compression of the spring 36, the area of the spool 27 at its after end 27B, and thus the area of the second piston 32, exposed to the hydraulic fluid at the outlet 25 and designated area A for purposes of identification, is greater than the area B of the spool 27 exposed to the hydraulic pressure from the inlet 24. (See FIG. 3) Upon receipt of a predetermined hydraulic inlet pressure, the force of the spring 36 is overcome, the spool 27 moving to the left. Movement from the first or rest position occurs due to the difference in areas between the inlet and outlet ends of the spool. The valve will stay in the position shown in FIG. 2 until the hydraulic force exerted against the area A is equal to the sum of the resultant hydraulic force exerted against the area B and the spring force. At this hydraulic pressure a state of balance will occur and a slightly larger inlet pressure will cause the spool 27 to move to the left until at a predetermined pressure the chamber 26A is closed off by the nose cone 48 preventing fluid communication between the inlet 24 and the outlet 25. The point of closing may be expressed mathematically as $P_1 A = P1 B + Fs$, where $P_1$ equals the pressure of closing, and Fs equals the force of the spring at closing. Additionally, as may be noted in FIG. 3, as the spool 27 moves to the left, both the first piston 29 and the second piston 32 move to the left with the spool 27, the piston 32 being carried by the leftward movement of the spool due to the abutting engagement of the first piston 29 with the inwardly and radially directed flange 33 associated with the piston 32.

The point at which the nose cone 48 causes sealing of the chamber 26A or the point at which the hydraulic pressure rate increase, going to the shoe type brakes should taper off, is one that must be picked for each brake system, depending upon the surface area of the shoes, the weight distribution of the motor vehicle, and the type of disc brakes being utilized as well as other well-known factors.

Figure 3:
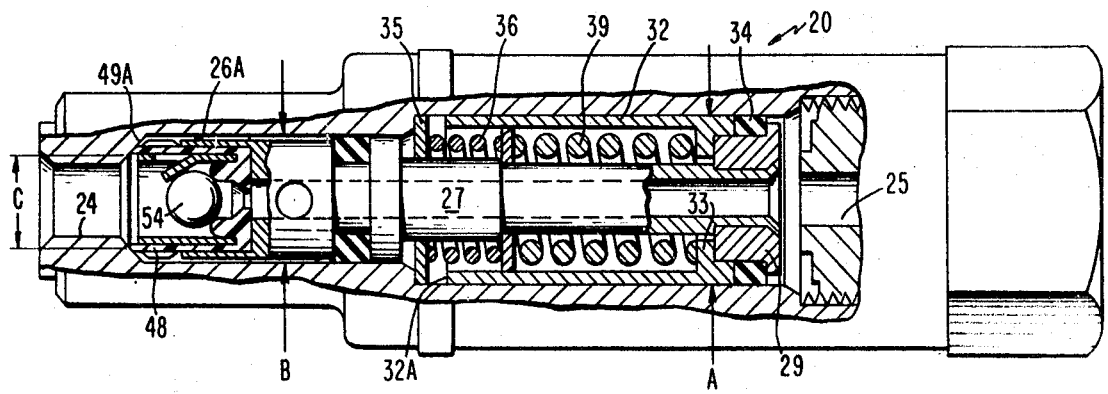
FIG. 3 is a fragmentary sectional view of the valve shown in FIG. 2 but illustrating the valve when it reaches its first split point and commences proportioning.

The sealing of the chamber 26A is accomplished by the nose cone 48, the nose cone 48 comprising the fluted cylindrical insert 50 connected to the inlet end 27A of the spool 27, in the present instance force fitted inside a cylindrical receiving chamber 51 and having mounted interiorly thereof a stiffening member 52 (see FIG. 2A). It should be noted that the stiffening member 52 has a leading edge 52A axially spaced interiorly of the conical lip 49 of the cylindrical insert 50. Preferably the cylindrical insert 50 is constructed of a stiff yet resilient material such as nylon, while stiffening member 52 may be composed of a resilient material having inwardly bent tabs 53 which serve to resiliently bias, axially of the spool 27, a check valve or ball 54. As shown, circumscribing the conduit extension 28B in the insert 50 is an annular projection 55 which serves as a seat for the ball 54, the tabs 53 and annular projection 55 serving to seal the conduit 28 via the extension 28B from the inlet 24. As illustrated in FIGS. 1 and 3, interiorly of the chamber 26A is a conical seat 49A which cooperates with the tapered lip 49 of the nose cone 48 and provides sealing engagement for the nose cone 48 upon the spool moving into its second position adjacent the inlet 24.

When the spool 27 is in its second position and the nose cone 48 is positioned in the seat 49A, as illustrated in FIG. 3, a different area C is exposed to the hydraulic pressure from the master cylinder 16. In the present instance, the area C is less than either the area B or A, whereby, after the spool has reached the second position, the pressure at the outlet 25 will remain at the pressure which caused the spool 27 to reach the second position, (i.e. $P_1$ until the new inlet pressure times the area C is great enough to overcome the force imbalance holding the spool in the second position. At this point, the spool will move briefly to the right permitting fluid communication between the inlet and outlet until the pressure times the area A overcomes the pressure times the area B once again closing the chamber 26A. The pressure trapped at the outlet will then be proportional to the inlet pressure no matter how rapidly inlet pressure increases. Thus if inlet pressure reaches $P_2$ (an increase over $P_1$), the pressure at the outlet will be approximately (assuming no hysteresis), $P_1 + C/A (P_2 - P_1)$.

Thus upon the first pressure being reached and the spool 26 moving into engagement with the conical seat 49A, as proportioning ratio between the pressure exposed to the inlet and that at the outlet is established. The point at which this occurs is normally referred to as the split point. A valve which will establish a single proportioning ratio is set forth in U.S. Pat. No. 3,304,130 to Doerfler dated Feb. 14, 1967.

Figure 4:
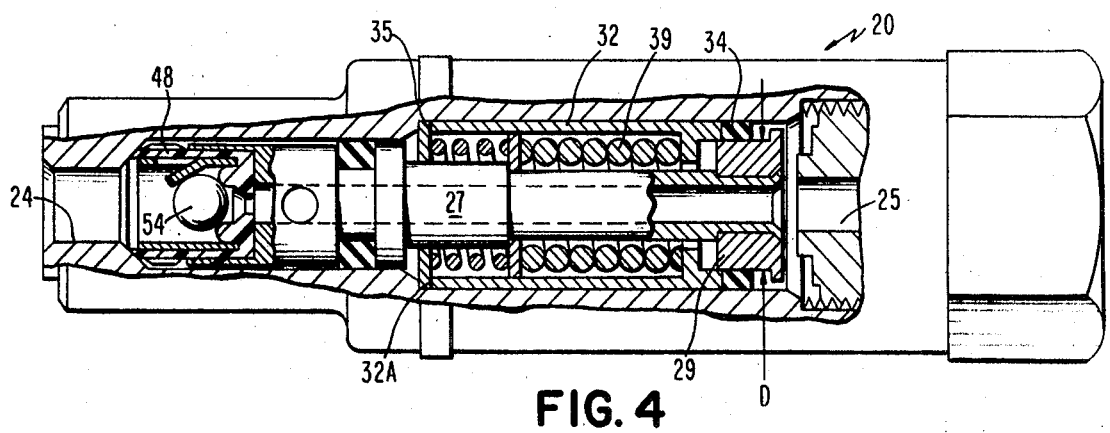
FIG. 4 is a fragmentary sectional view of the novel valve of the present invention illustrating the valve after it has reached its second split point and commences proportioning at a different rate.

Upon a further increase in pressure, and as the pressure raises at the outlet 25 at a proportional rate to the increase of pressure at the inlet 24, the second piston 32 starts moving toward the left against the pressure of the heavy spring 39 until the piston's terminal end 32A abuts the disc or washer 35. (See FIG. 4) As the second piston 32 abuts the disc or washer 35 the seal 34 is separated from the radially extending flange portion 30 of the first piston 29 and at that point the first piston of the spool 27 is free to move relative to the second piston 32. As shown in FIG. 4, the first piston 29 has an area in cross section D which is exposed to the outlet, the area D being less than the area A. From this point a new proportioning ratio is established between the area C of the nose cone 48, and the area D of the spool 27 exposed to the outlet 25. If the cross-sectional area D of the first piston 29 is equal to the cross sectional area C of the nose cone 48, the proportioning ratio will not be 1:1 and pressure at the outlet will increase at the same rate as pressure at the inlet increases. Alternatively, if the cross-sectional area D is larger than the cross-sectional area C but less than the cross-sectional area A then the proportioning rate will change but pressure at the outlet will still increase at a lower rate than the rate of increase at the inlet. In addition, if the area D is less than the area C, the proportioning rate will be changed such that outlet pressure will approach the inlet pressure.

Figure 5:
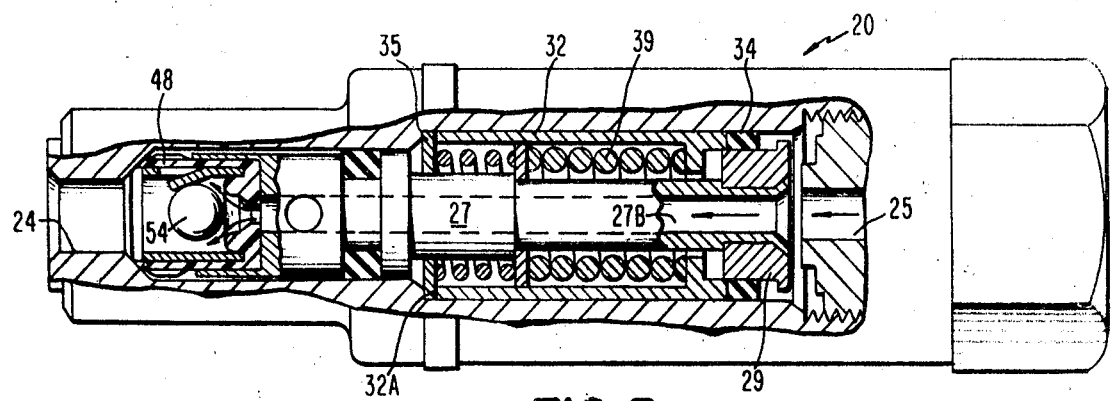
FIG. 5 is a fragmentary sectional view of the valve of the present invention illustrating the position of the various elements upon release of hydraulic pressure at the inlet.

Upon release of the foot pedal 22A, and reduction of the hydraulic pressure to the inlet 24, it is desirable that the rear brakes 13 as well as the disc brakes 11 be immediately deenergized. To this end, as illustrated in FIG. 5, the sudden release of pressure at the inlet will cause a fluid differential pressure between the conduit 28 and the inlet 24 causing the check valve ball 54 to press against the tabs 53 and move away from its annular seat 55 allowing fluid communication between the outlet 25 and the inlet 24 thus releasing the pressure on the shoe brakes 23. At this point, the spool will move to the right and permit normal access of the conduit 28 with the chamber 26A and the inlet 24.

Thus the proportioning valve of the present invention permits the establishment of two proportioning ratios, the choice of crossover points or split points being easily established by proper choice of springs and first and second piston diameters.

With the trend to improve braking, and with the advent of lower manufacturing costs of disc brakes, the present forecast is that disc brakes will become standard equipment on automotive vehicles within a short period of time. However, it will still be necessary, because of weight imbalance and center of gravity shift when braking to proportion the fluid pressure at the rear brakes relative to the front brakes. The valve of the present invention will be particularly useful in supplying an inherent safety factor as it will permit blending to full-line pressure upon the second proportioning level being attained. Additionally, in motor vehicles having pressure differential switches which warn by a light or a buzzer when one of the brake systems has a flaw or a malfunction, upon failure of the front brake system, instead of an instant override of the proportioned line pressure to the rear brakes which occurs in state of the art-type differential switches, causing instantaneous lockup of the rear brakes causing loss of control of the vehicle, the valve of the present invention will permit a gradual buildup in line pressure to the rear brakes which will give the driver of the vehicle greater control in bringing the vehicle to a halt.

Another distinct advantage of the dual stage proportioning valve as described above is that present proportioning valves such as disclosed in U.S. Pat. No. 3,365,243 do not permit of testing the hydraulic "plumbing" to full master cylinder pressure because of the proportioning effect. However, with the design of the present invention, the complete hydraulic brake system may be tested using the same master cylinder pressure fore and aft of the proportioning valve as long as the test line pressure is higher than the second proportioning level.

It should be recognized that while the above disclosure describes the valve of the present invention particularly for use in hybrid hydraulic brake systems, it is necessary where weight imbalance exists, and for better braking and control during braking of the motor vehicle, to provide a proportioning valve. This means that in brake systems having all four brakes of either shoe or disc, such a valve is desirable.

Although the invention has been described with a certain degree of particularity it should be understood that the present disclosure is only exemplary of the invention, that numerous changes in the details of construction, and the combination and arrangement of parts may be made without departing from the spirit and scope of the invention as hereinafter claimed.

What I claim is:

1. A valve for proportioning fluid hydraulic pressure comprising a valve body having a hydraulic fluid inlet and outlet connected by a bore; a spool slidably disposed in said bore and movable between a first position adjacent said outlet and a second position adjacent said inlet; means on said spool for sealing said inlet from said outlet; first piston means on said spool and second piston means slidably disposed on said spool; said first piston means having a first cross-sectional area exposed to said outlet pressure and said second piston means having a larger cross-sectional area exposed to said outlet pressure than said first piston means; first biasing means to urge said first and second piston means together with said spool to said first position, said piston means having a combined cross-sectional area greater than the cross-sectional area of the portion of said spool exposed to inlet pressure whereby inlet pressure is communicated from said inlet to said outlet until a first predetermined inlet pressure is reached whereupon the imbalance of hydraulic forces of such pistons relative to the inlet end of said spool causes said spool to move against said first biasing means and seal said inlet from said outlet and thereafter proportion pressure from said inlet to said outlet at a first proportioning rate until a second predetermined higher inlet pressure is reached; and second biasing means urging said second piston into abutment with said first piston until said second predetermined inlet pressure is reached and the pressure at said outlet permits said second piston to overcome said second biasing means and separate said second piston from said first piston to establish a second proportioning rate at pressures in excess of said second predetermined inlet pressure, said second proportioning rate being established by the first piston cross-sectional area and cross-sectional area of said spool exposed to inlet pressure.

2. A valve in accordance with claim 1 including poppet means between said inlet and said outlet, said poppet means operable to permit fluid flow from said outlet to said inlet upon a decrease of pressure at said inlet relative to said outlet.

3. A valve in accordance with claim 2 including a fluid passageway in said spool, said poppet means being positioned in said passageway.

4. A valve in accordance with claim 7 including stop means engageable by said second piston means upon said second hydraulic inlet pressure being reached, and seal means slidably disposed intermediate said first and second piston means.

5. A hydraulic brake system for automotive vehicles having disc brakes on one set of wheels and shoe brakes on a second set of wheels, a master cylinder and a proportioning valve intermediate said master cylinder and one of said sets of brakes; said proportioning valve comprising a valve body having a hydraulic fluid inlet connected to said master cylinder, and a hydraulic fluid outlet connected to said one of said sets of brakes, said outlet and inlet connected by a bore in said valve body; a spool slidably disposed in said bore and movable between a first position adjacent said outlet and a second position adjacent said inlet; means on said spool for sealing said inlet from said outlet; first piston means on said spool and second piston means slidably disposed on said spool; said first piston means having a first cross-sectional area exposed to said outlet pressure and said second piston means having a larger cross-sectional area exposed to said outlet pressure than said first piston means; first biasing means to urge said first and second piston means together with said spool to said first position, said piston means having a combined cross-sectional area greater than the cross-sectional area of the portion of said spool exposed to inlet pressure whereby inlet pressure is communicated from said inlet to said outlet until a first predetermined inlet pressure is reached whereupon the imbalance of hydraulic forces of said pistons relative to the inlet end of said spool causes said spool to move against said first biasing means and seal said inlet from said outlet and thereafter proportion pressure from said inlet to said outlet at a first proportioning rate until a second predetermined higher inlet pressure is reached; and second biasing means urging second piston into abutment with said first piston until said second predetermined inlet pressure is reached and the pressure at said outlet permits said second piston to overcome such second biasing means and separate said second piston from said first piston to establish a second proportioning rate at pressures in excess of said second predetermined inlet pressure, said second proportioning rate being established by said first piston cross-sectional area and the cross-sectional area of said spool exposed to inlet pressure.

6. A hydraulic brake system in accordance with claim 5 including passage means intermediate said inlet and said outlet means, and check means in said passage means whereby upon said hydraulic pressure at said outlet means being greater than said pressure at said inlet means, said check means will permit fluid from said one brake set to said master cylinder.

7. A hydraulic brake system in accordance with claim 5 wherein said master cylinder comprises a dual master cylinder, one of said master cylinders being connected to said proportioning valve and the other of said master cylinders being connected to said other set of brakes.